United States Patent [19]
Arnold et al.

[11] Patent Number: 5,754,343
[45] Date of Patent: May 19, 1998

[54] REFLECTIVELY CONTROLLABLE GLAZING

[75] Inventors: Manfred Arnold, Meckenbeuren; Werner Scherber, Bermatingen; Andreas Leupolz, Ravensburg; Stefan Uhl, Stuttgart; Günter Abersfelder, Sindelfingen, all of Germany

[73] Assignee: Dornier GmbH, Friedrichshafen, Germany

[21] Appl. No.: 405,276

[22] Filed: Mar. 15, 1995

[30] Foreign Application Priority Data

Mar. 15, 1994 [DE] Germany ............... 44 08 712.8

[51] Int. Cl.⁶ ................................................. G02B 27/00
[52] U.S. Cl. ..................... 359/578; 52/171.3; 52/786.11
[58] Field of Search ........................... 359/350, 359, 359/578, 847; 52/786.1, 786.11, 786.12, 171.3; 296/97.1, 97.2, 97.4

[56] References Cited

U.S. PATENT DOCUMENTS

| | | |
|---|---|---|
| 3,424,515 | 1/1969 | Risk ............................. 359/591 |
| 4,337,998 | 7/1982 | Basiulis ......................... 359/886 |
| 4,536,998 | 8/1985 | Matteucci et al. ............. 52/171.3 |
| 4,597,629 | 7/1986 | Kraushaar et al. ............. 359/358 |
| 4,813,198 | 3/1989 | Johnston et al. ............... 52/171.3 |
| 5,099,621 | 3/1992 | Schacklette et al. ........... 52/171.3 |
| 5,231,530 | 7/1993 | Yen ............................... 359/228 |

FOREIGN PATENT DOCUMENTS

| | | |
|---|---|---|
| 0 250 742 | 1/1988 | European Pat. Off. . |
| OS 3614016 | 10/1987 | Germany . |
| 645110 | 1/1979 | U.S.S.R. . |

*Primary Examiner*—Paul M. Dzierzynski
*Assistant Examiner*—Darren E. Schuberg
*Attorney, Agent, or Firm*—Evenson, McKeown, Edwards & Lenahan, P.L.L.C.

[57] ABSTRACT

A pane made of glass or plastic, whose optical degree of reflection can be controlled by switching between two different interference conditions. As a result, the transmissibility with respect to sun radiation can be reduced very efficiently and an excessive heating of glazed objects can be prevented. Preferred applications of the invention are the climate control of motor vehicles, rail vehicles, airplanes and buildings.

23 Claims, 4 Drawing Sheets

REFLECTIVELY CONTROLLABLE GLAZING

BACKGROUND OF THE INVENTION

This invention relates to a pane made of glass or plastic whose optical degree of reflection can be controlled in that a switching takes place between two different interference conditions. As a result, the transmissibility with respect to sun radiation can be very efficiently reduced and an excessive heating up of glazed objects can be prevented. Preferred applications of the invention relate to the climate control of motor vehicles, rail vehicles, airplanes and buildings.

In order to prevent a high solar heating of buildings or vehicles, mechanical remedies, such as drapes and shades, have so far mainly been used. In addition, developments are known which relate to a controllable transmission of the pane itself. However, in each case, changes of transmission are achieved by means of a change of the absorption characteristics. On the one hand, this may take place in a double-walled pane system by the addition of absorbing liquids or gases (U.S. Pat. Nos. 1,977,477 and 3,424,515). Likewise, electrochromic pane systems exist in a laminated glass technique whose color and absorption can be varied by feeding a voltage to two transparent electrodes integrated in the system (EP 0 027 855, DE 36 14 547).

A common disadvantage of these attempts to obtain a controllable transmission of the panes is their absorptive operating mechanism. When the absorptive pane is heated, particularly, in the case of sun radiation of a longer duration, there will be a time-delayed indirect heating-up of the space situated behind it. Thus, when the radiation periods are long, the control effect of these systems will be low.

SUMMARY OF THE INVENTION

It is an object of the invention to develop a pane system in which the control of the transmission characteristics does not take place by means of changing the degree of absorption but mainly by means of changing the degree of reflection. Thus, the largest amount of arriving solar radiation is reflected directly; even when the sun radiation lasts a fairly long time, the pane will remain cold; and an indirect heating-up of the space situated behind it is prevented.

Figure 1:
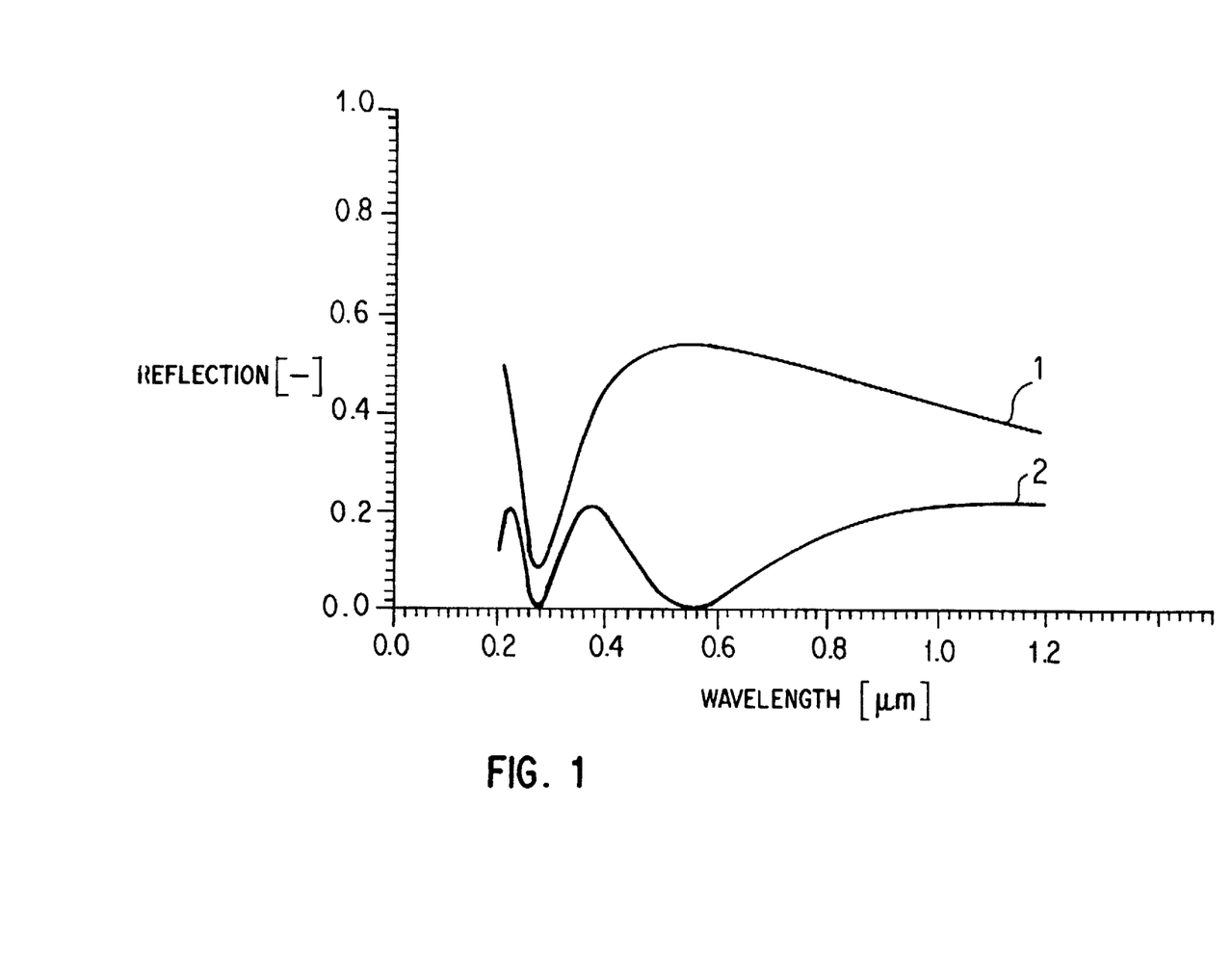
FIG. 1 is a diagram with the theoretical course of the reflection for the two switching conditions as a function of the wavelength (high reflection: 1, high transmission: 2)

A pane which can be switched between transmissive and reflective conditions can in principle be implemented by means of an interference formulation. For this purpose, the pane system, which consists, for example, of two glass panes or of a glass pane and a transparent foil, is coated on the interior sides with an optically transparent, preferably highly refractive material. In this case, the optical layer thickness is, for example, designed such that the maximal reflection of the individual layers is insured (condition: $n \cdot d = \lambda/4$) in the range of the maximum of the solar radiation ($\lambda_{max} = 550$ nm). As long as the pane components and, together with them, the interior interference layers are separated, a high overall reflection of the system is obtained because then the reflections of the individual layers will add up by approximation. If the components and therefore also the optical function layers are brought together for contacting one another, with respect to the optical effect, a $\lambda/2$-layer ($n \cdot d = \lambda/2$ as interference conditions) is obtained from the two original $\lambda/4$-layers. This switching condition is distinguished by minimal reflection and (with low or negligible absorption) by a high transmission. In the example of a $\lambda/4$-layer with a refractive index of $n=2.5$, FIG. 1 illustrates the theoretical course of the reflection with the wavelength for the open switching condition (Condition 1: high reflection) as well as for the closed switching condition (Condition 2: low reflection).

Other possible, reflectively switchable systems by the coupling of interference layers may also be used, such as $\lambda/4 + 3/4 \cdot \lambda \rightarrow \lambda$ or $\lambda/6 + \lambda/3 \rightarrow \lambda/2$.

The indicated switchable interference formulation is known from the field of thermal infrared radiation (EP 0 250 742). It is used there for the control of the emission capacity and thus for regulating the heat radiation of a body. A mentioned example is controllable infrared camouflaging which can be adapted to environmental conditions.

The application of the principle of the interference layers which can be switched between transmissive and reflective conditions implemented in the thermal infrared range ($\lambda=10$ nm) to the area of optical wavelengths (400 nm $\leq \lambda \leq$ 700 nm) seems to suggest itself, but fails in the practical implementation because of the fact that when the system is closed, a residual gap will always remain. Its thickness is in the order of from 100 nm to 200 nm and, in the case of firm system components, such as glass or plastic, is caused by waviness; in the case of flexible components, such as plastic films or foils, it is caused by their inherent stiffness as well as by the surface roughness of the participating materials and of the layers applied thereon. In the case of applications in the thermal infrared range, the influences of the gap are very low. Since the gap width clearly remains below the typical thicknesses of the interference layers (d>0.5 nm), only a compensation is necessary there in the form of an adaptation of the interference layer thickness. In the optical range, typical interference layer thicknesses of d<60 nm will occur. Here, the influence of the gap even becomes dominant and a closing of the system into the $\lambda/2$-condition of high transmission becomes impossible.

The object of the invention is achieved by providing a double pane made of glass or plastic with a controllable degree of reflection for controlling the entering of sunlight and solar heat into vehicles or buildings, comprising at least one interference layer which can be moved within the double pane.

It is preferred that at least one of the interference layers is arranged on a movable, highly flexible, transparent film of low surface roughness. The film of low surface roughness is made of any suitable material such as PVB, PC, PVC, ASA, PA, CA or a composite of two or more plastic films. The film of low surface roughness is preferably made of polyurethane.

It is also preferred that at least one of the film and the side of one of the panes facing the film is provided with at least one interference layer. It is advantageous that the interference layer is a $\lambda/4$-layer.

In another embodiment, the double pane comprises two highly flexible films, the sides of the two highly flexible films which face the exterior panes being provided with at least one interference layer.

The interference layer is made of a transparent, highly refractive material. Suitable transparent, highly refractive materials are $TiO_2$, $Bi_2O_3$, $Ta_2O_5$, $WO_3$, $Nb_2O_5$, $HfO_2$, $Si_3N_4$, and ITO.

Alternatively, or in addition to the transparent, highly refractive material, a thin transparent layer made of metal or a high-refracting transparent polymer layer which, in each case, has ductile characteristics, can be provided on the highly flexible film.

In another aspect of the invention, the double pane further comprises means for moving the highly flexible film. The moving means could be pneumatic or hydraulic.

The double pane could comprise one layer stack respectively of several interference layers.

In the construction of the double pane according to the invention, the first of the two panes (denoted as "exterior panes") and the highly flexible film form a first chamber, and the second of the two exterior panes and the highly flexible film form a second chamber, and means are provided for filling or evacuating at least one of the two chambers with a liquid or gaseous medium.

The double pane structure could also include an additional film within the two exterior panes in addition to the highly flexible film whereby a first chamber is formed between the first exterior pane and the highly flexible film, a second chamber is formed between the highly flexible film and the additional film, and a third chamber is formed between the additional film and the second exterior pane; and means are provided for selectively filling or evacuating the chambers with transparent or absorbing media.

BRIEF DESCRIPTION OF THE DRAWINGS

The invention will be described in detail in the following description of the preferred embodiments, which makes reference to the appended drawings in which:

FIGS. 4.1 to 4.3 show various switching conditions of the three-chamber arrangement: reflective 4.1, transmissive 4.2, absorptive 4.3; and FIGS. 5.1 and 5.2 are representations of a solar front wall of a conventional construction 5.1 and with a glazing 5.2 which can be switched between the transmissive and reflective conditions.

DESCRIPTION OF THE PREFERRED EMBODIMENTS

Figure 2:
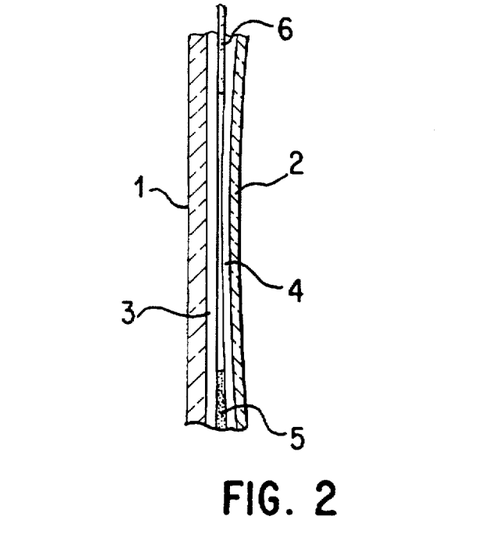
FIG. 2 is a cross-sectional view of a system with a switchable deflection having a coated glass pane or plastic pane and a flexible coated plastic film.

Attention is directed to FIG. 2 which shows a pane system of a first embodiment. As illustrated in FIG. 2, in the simplest case, the system comprises a glass pane or a plastic pane 1 and a transparent film or foil 2 of a high optical quality which are both coated on the interior side as indicated at 3, 4. As the coating material, preferably optically transparent, high-refracting materials are used, such as $TiO_2$, $Bi_2O_3$, $Ta_2O_5$, $WO_3$, $Nb_2O_5$, $HfO_2$, $Si_3N_4$, ITO (indium tin oxide). The layer thicknesses are designed as $\lambda/4$-layers for the wavelength range of the maximal radiation intensity of the solar spectrum ($\lambda=550$ nm). In a preferred embodiment, the system may be controlled pneumatically. For this purpose both components are glued together at the edge in a vacuum-tight manner using a suitable adhesive 5. The interior space is evacuated or pressurized by way of suction connections 6 and thus can be switched between conditions of high transmission (cell closed) and high reflection (cell open). For increasing the reflection switching stroke, the illustrated $\lambda/4$-$\lambda/2$-switching principle may be arranged twice in series. For this purpose, two highly flexible films are movably arranged within the two exterior panes of a double pane system. The sides of the films, which are situated opposite the exterior panes, are each provided with an interference layer. The interior sides of the exterior panes are also provided with an interference layer.

The film or foil which is used is distinguished by an extremely high flexibility and very low surface roughness. Preferably a highly flexible PU (polyurethane) film, a foil with a similarly good flexibility [such as PVB (polyvinylbutyral), PC (polycarbonate), PVC (polyvinyl chloride) ASA (acrylonitrilestyrene-acrylic ester), PA (polyamide), CA (cellulose acetate) or polysiloxane] or a flexible film composite consisting of two or more of these plastic films is used. The high flexibility connected with the soft and smooth surface of the film guaranties an optimal closing of the system to the smallest residual gap thicknesses which are in the range of from 15 nm<d<30 nm and are predominantly determined by the surface roughnesses. Such minimal residual gaps are almost unimportant for the optical behavior and thus permit the implementation of the closed switching condition with high transmission.

Figure 3:
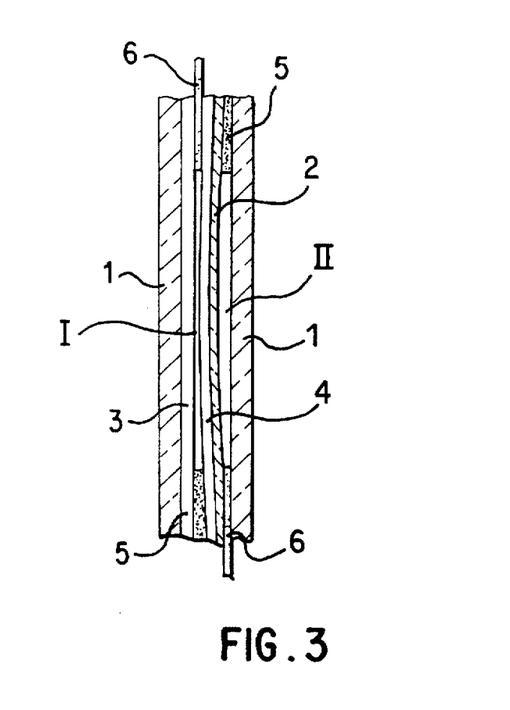
FIG. 3 is a cross-sectional view of a reflectively controllable double-cell arrangement with two separate chambers which may be alternately pressurized and evacuated.

Another advantageous embodiment of the system consists of a double cell arrangement as shown in FIG. 3. This arrangement comprises two separate exterior panes 1 made of glass or plastic. Similar to a laminated glass arrangement, a highly flexible PU-film 2 is clamped in the center and is glued to the edge in a vacuum-tight manner in the direction of both panes using a suitable adhesive 5. Thus, two separate spaces I, II, which can each be evacuated by way of suction connections, exist between the film and the panes. In one of these spaces I, the glass and the film are coated on the interior side as shown at 3, 4. In this case, the opening of the system into the reflecting $\lambda/4$-condition takes place by evacuating the rear additional space II as well as by subsequently pressurizing the interference cell I. Inversely, the closing into the condition of high transmission takes place after an evacuating of volume I and a subsequent pressurizing of rear space II. This embodiment has the additional advantage that, during the evacuating, constrictions, which are caused by the high flexibility of the film which is used, and therefore long pumping times, that is, long switching periods of the system, as may occur in the first embodiment may be avoided.

The replacement of the ceramic layers, i.e., the coating materials such as $TiO_2$, $Bi_2O_3$, $Ta_2O_5$, $WO_3$, $Nb_2O_5$, $HfO_2$, $Si_3N_4$, ITO, on the foil side as described with reference to the first embodiment by materials of a ductile character is also advantageous. High-refracting polymer layers are particularly advantageous for this purpose which are adapted for this purpose with respect to the interference. Polymer layers of this type may be produced, for example, by the mixing of organic and inorganic constituents, for example, by means of sol-gel processes or by CVD-like plasma polymerization processes. As a supplement to a pure interference design, the use of thin, transparent metal layers is also possible. Precious metals are preferably used, such as Au, Ag, Pt, Ir as well as metals with a case of refractive index versus wavelength corresponding to a $\lambda/4$ design, such as Cr or Os. The decisive advantage of layers with ductile characteristics is the fact that they are able to better withstand the considerable expansions of the highly flexible PU-film during the switching operation.

Another embodiment of the invention resides in the possibility of a combination with absorptive measures. As a result, a glazing is implemented for the first time which can be switched selectively between the three transmissive, reflective and absorptive conditions. In the simplest case, these characteristics are achieved by the series arrangement, for example, in a three-pane composite, of a system switching between the transmissive and reflective conditions with a unit which switches between being transmissive and absorptive (on the basis of absorbing liquids or on the basis of electrochromic systems). In addition to the basic transmissive, absorptive and reflective conditions, mixed conditions may also be implemented. A typical example is the simultaneous condition of being reflective and absorptive. In this case, the sunlight is first reflected in the system which is switching between being transmissive and reflective. It is reflected at a percentage to which the normal maximal reflection of the system is adjusted. The remainder which passes through can be absorbed in the unit which acts transmissively or absorptively, and the thermal efficiency can therefore be further increased.

Figure 4:
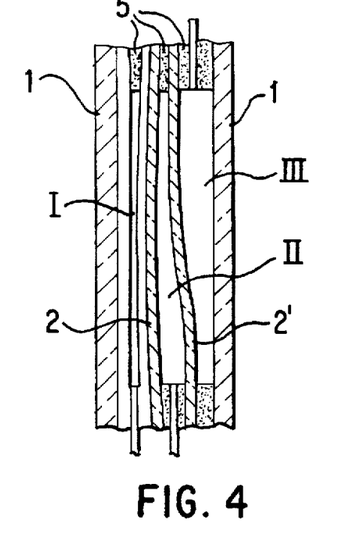
FIG. 4 is a cross-sectional view of a three-chamber arrangement for the hydraulic control of the reflection which, in the condition of low reflection can, by adding absorbing liquids, in addition, be switched into an absorptive condition.

A special embodiment of a glazing which can be switched between the transmissive, absorptive and reflective conditions will be described by reference to FIG. 4. The system includes two panes 1 and is divided by means of two additional separating films 2, 2' into a total of three chambers I, II, and III. Chamber I corresponds to a cell according to the first embodiment which can be switched between the transmissive and the reflective conditions, with the highly flexible film 2 as a separation with respect to chamber II. Chambers II and III are also separated from one another by a flexible film 2' and are sealed off at the edge with a suitable adhesive 5. This flexible film 2' is transparent as well as gas-tight and liquid-tight. It must not necessarily have the high flexibility of film 2. Suitable materials for the flexible film 2' are, for example, PU (polyurethane), PET (polyethylene terephthalate), PTFE (polytetrafluorethylene). The chambers II and III may selectively be filled with liquid. In the reflective condition, the liquid is removed from chambers II and III with the exception of a very thin liquid film which is insignificant with respect to the optical effect; the interference chamber I is pressurized (FIG. 4.1). The transmissive or absorptive condition is achieved by the fact that chamber I is evacuated and pressure is applied to the rear, highly flexible PU-film, whereby the originally separated λ/4-layers are changed to a λ/2-condition of minimal reflection. As a supplement to the first, second, and third embodiments, the pressure may also be generated hydrostatically by feeding a liquid on the one hand, in this case, for example, chamber II is filled with a highly transparent liquid, chamber III simultaneously remaining empty (FIG. 4.2). This represents the transmissive condition of the overall system. As an alternative, the transparent liquid is removed from chamber II, and chamber III is filled with an absorbing liquid. As illustrated in FIG. 4.3, here also, a hydrostatic pressure is exercised on the interference cell I. This configuration describes the absorptive condition of the overall system. If, instead of a transparent and an absorbing liquid, two liquids with different colors or different degrees of absorption are selected, by means of this system, in addition to a reflective condition, two conditions of different colorings or absorptions may also be represented.

A preferred application of panes which can be switched between being transmissive and reflective is its use in a motor vehicle. In this case, panes of this type can significantly increase the comfort with respect to the thermal control of the vehicle. One circumstance which considerably reduces the vehicle comfort is the fact that the interiors of parked vehicles heat up considerably when standing in the sun. This heating takes place predominantly by the entering of heat through the transparent panes. At this point, mechanisms are therefore in demand which prevent the transmission of the sunlight into the vehicle interior. In addition to mechanical remedies (such as shades), pane systems are conceivable which switch between being transmissive and absorptive, such as EC-elements or panes with an absorbing liquid. However, their thermal effect is only noticeable during short-term parking. In the case of a longer exposure to solar radiation, the panes which are absorptive in the parked condition will themselves heat up considerably and will transmit their heat to the interior by way of thermal radiation and convection. As a result, even though there is a certain time delay, this results in an indirect heating of the vehicle interior which has an intensity similar to that without any measures involving panes.

Reflectively operating glazing is much more efficient in this situation. Even in the case of a reflection of only 50%, clearly lower interior temperatures are achieved and therefore a considerable gain with respect to the comfort at the start of the drive. Since, for reasons of safety, increased pane reflections during the driving operation are not permitted, only pane systems with a switchable reflection can be considered for this application in motor vehicles. During the drive, thermal comfort, such as the elimination of disturbing direct sun radiation on the occupants, may be achieved by an additional absorptive measure, for example, the abovementioned transmissively or absorptively or reflectively acting pane control.

Another extensive field of application for panes which can be switched between transmissive and reflective conditions is the thermal control of buildings. First, with respect to the glazing of buildings, panes are conceivable for protection against intense sun radiation which can be-switched between transmissive and reflective conditions and replace shades and other mechanical remedies. However, they can mainly represent a valuable component in the implementation of energy-saving heating concepts by the additional utilization of solar energy, for example, by their integration into a solar front wall concept which will be explained by means of FIG. 5.1. By means of a solar front wall, solar energy which enters a building in the winter is to contribute to the heating of the building. For this purpose, it is necessary that the solar energy absorbed by the absorbing surfaces 7 of the building walls 8 cannot be conveyed to the outside environment but reaches the interior of the building by way of heat conduction through the brickwork 8. Preferably, massive building materials, such as lime sand brick, are used for this purpose. In order to minimize heat losses to the outside, an additional transparent insulation is used. This function is carried out by a double-walled insulating glass system which is constructed in front of the wall and has an integrated optically transparent heat insulation in a capillary or honeycomb shape 9. As a result of this construction, the sunlight can reach the brickwork almost without intensity loss and can be absorbed there. A conveying of the heat generated there to the outside is reduced considerably by the transparent insulation. While such a solar front wall construction works in a desired manner in the winter by utilizing solar energy, in the summer, it results in an undesirable heating of the interior spaces because of the absent insulating effect of the brickwork. Mechanical remedies, such as shades, which are mounted behind the front pane, have mainly been used as a countermeasure. However, its reliability is very limited. A more reliable solution according to the invention is an exterior pane 10 of the transparent heat insulation which can be switched between the transmissive and reflective conditions and is illustrated in FIG. 5.2. In this case, in the summer operation, in the reflective position, the solar radiation is reflected directly on the surface and can therefore also not indirectly result in the entering of heat. In order to avoid disturbing visual blinding effects by directed reflection, the front pane of the front wall which can be switched between the transmissive and reflective conditions may be constructed, for example, as milk glass of a considerably dispersing character, on the exterior side.

What is claimed is:

1. A double pane made of glass or plastic with a controllable degree of reflection for controlling the entrance of visible light into vehicles or buildings, comprising at least one interference layer which can be moved within the double pane between a reflective position in which the interference layer is spaced at a distance from another interference layer, and a transmissive position in which the interference layer is in contact with said another interference layer.

2. A double pane according to claim 1, wherein at least one of the interference layers is arranged on a movable, highly flexible, transparent film of low surface roughness.

3. A double pane according to claim 2, wherein said film of low surface roughness is made of polyurethane.

4. A double pane according to claim 2, wherein said film is PVB, PC, PVC, ASA, PA, CA or a composite of two or more plastic films.

5. A double pane according to claim 2, wherein said film and the side of one of the panes facing said film are each provided with one of said interference layers.

6. A double pane according to claim 5, wherein each of said interference layers is a λ/4-layer.

7. A double pane according to claim 2, comprising two highly flexible films, the sides of the two highly flexible films which face the panes of said double pane being provided with at least one interference layer.

8. A double pane according to claim 7, wherein said interference layers are λ/4-layers.

9. A double pane according claim 2, further comprising a thin transparent layer made of metal or a high-refracting transparent polymer layer which, in each case, has ductile characteristics, on the highly flexible film.

10. A double pane according to claim 2, further comprising means for moving the highly flexible film.

11. A double pane according to claim 10, wherein said moving means is pneumatic.

12. A double pane according to claim 10, wherein said moving means is hydraulic.

13. A double pane according to claim 2, wherein a first of the panes of said double pane and the highly flexible film form a first chamber, and a second of the panes of said double pane and the highly flexible film form a second chamber, further comprising means for filling or evacuating at least one of the two chambers with a liquid or gaseous medium.

14. A double pane according to claim 2, further comprising an additional film within the double pane, in addition to the highly flexible film, whereby a first chamber is formed between a first pane of said double pane and the highly flexible film, a second chamber is formed between the highly flexible film and the additional film, and a third chamber is formed between the additional film and a second pane of said double pane; and means for selectively filling or evacuating the chambers with transparent or absorbing media.

15. A double pane according to claim 2, wherein in said transmissive position residual gaps are present between said interference layer and said another layer due to said surface roughness of the film, and wherein said surface roughness of the film is selected such that a thickness of said residual gaps is less than 30 nm.

16. A double pane according to claim 1, wherein said interference layer comprises a stack of several layers.

17. A double pane according to claim 1, wherein the at least one interference layer comprises a transparent, highly refractive material.

18. A double pane according to claim 17, wherein the transparent, highly refractive material is a member of the group consisting of $TiO_2$, $Bi_2O_3$, $Ta_2O_5$, $WO_3$, $Nb_2O_5$, $HfO_2$, $Si_3N_4$, and ITO.

19. A double pane according to claim 1, wherein said interference layers have a thickness of less than 60 nm.

20. A double pane according to claim 1, wherein said interference layer has a thickness d according to the condition: $n \cdot d = \lambda/4$, where n is the refractive index of the interference layer, and where λ is approximately the maximum solar radiation wavelength $\lambda_{max}=550$ nm.

21. A double pane made of glass or plastic with a controllable degree of reflection for controlling the entrance of visible light into vehicles or buildings, comprising a movable, highly flexible, transparent film of low surface roughness with a thin transparent layer made of metal or a high-refracting transparent polymer layer which, in each case, has ductile characteristics thereon disposed between the two panes of the double pane, wherein said film is movable between a reflective position in which the transparent layer made of metal or the transparent polymer layer is spaced at a distance from another interference layer, and a transmissive position in which the transparent layer made of metal or the transparent polymer layer is in contact with said another interference layer.

22. A double pane with a controllable degree of reflection for controlling the entrance of visible light into vehicles or buildings, comprising:

a pair of panes made of glass or plastic arranged essentially parallel to and spaced at a distance from each other, an interior face of at least one of said panes being coated with a pane interference layer; and at least one other interference layer interposed between said pair of panes, said other interference layer being movable between a reflective position in which the other interference layer is spaced at a distance from said pane interference layer, and a transmissive position in which the other interference layer is in contact with said pane interference layer, wherein in said reflective position said visible light is reflected by each of said pane interference layer and said other interference layer, and wherein in said transmissive position said visible light is transmitted through said pane interference layer and said other interference layer.

23. A double pane according to claim 22, wherein said pane interference layer is coated on a first of said pair of panes, and said other interference layer is coated on a first side of a flexible film, said first pane and said flexible film defining a first chamber, and a second chamber being defined on a second side of said flexible film opposite said first side, further comprising means for pressurizing and evacuating each of said first and second chambers.

* * * * *

UNITED STATES PATENT AND TRADEMARK OFFICE
CERTIFICATE OF CORRECTION

PATENT NO. : 5,754,343
DATED : May 19, 1998
INVENTOR(S) : Manfred Arnold et al.

Figure 4A:
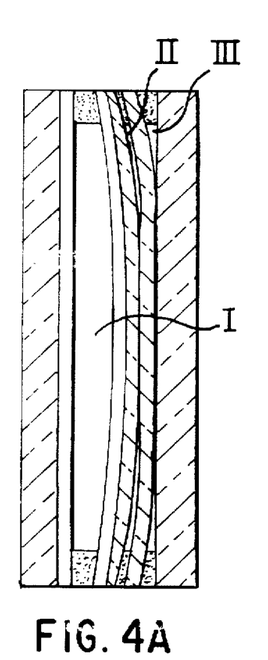
Figure 4B:
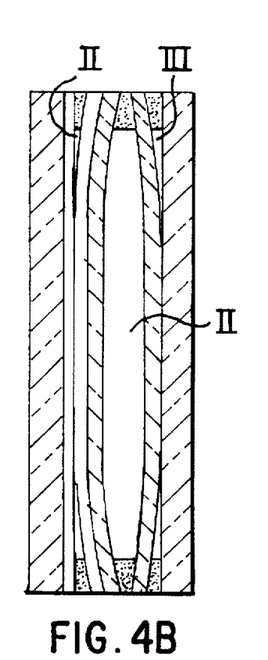
Figure 4C:
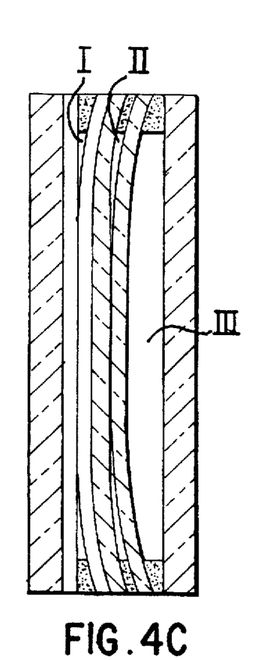
Figure 5A:
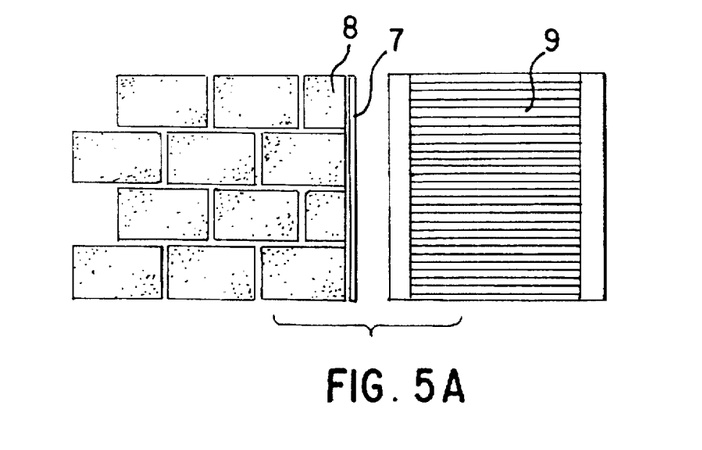
Figure 5B:
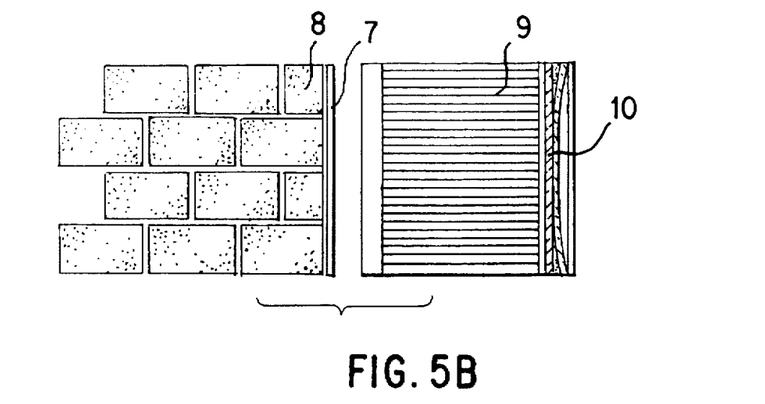

It is certified that error appears in the above-identified patent and that said Letters Patent is hereby corrected as shown below:

Column 3, line 37, change "FIGS. 4.1 to 4.3" to --FIGS. 4A, 4B and 4C--.

line 38, change "4.1" to --4A--, and change "4.2" to --4B--.

line 39, change "4.3" to --4C--.

line 40, change "FIGS. 5.1 AND 5.2" to --FIGS. 5A and 5B--.

line 41, change "5.1" to --5A--, and change "5.2"

UNITED STATES PATENT AND TRADEMARK OFFICE
CERTIFICATE OF CORRECTION

PATENT NO. : 5,754,343
DATED : May 19, 1998
INVENTOR(S) : Manfred Arnold et al.

It is certified that error appears in the above-identified patent and that said Letters Patent is hereby corrected as shown below:

to --5B--.

Column 5, line 37, change "(FIG. 4.1)" to --(FIG. 4A)--.

lines 46-47, change "(FIG. 4.2)" to --(FIG. 4B)--.

line 50, change "FIG. 4.3" to --FIG. 4C--.

Column 6, lines 37-38, change "FIG. 5.1" to --FIG. 5A--.

line 65, change FIG. 5.2" to --FIG. 5B--.

Signed and Sealed this

Eighth Day of June, 1999

Attest:

Q. TODD DICKINSON

*Attesting Officer*    *Acting Commissioner of Patents and Trademarks*